United States Patent [19]

Takahashi

[11] Patent Number: 4,976,461
[45] Date of Patent: Dec. 11, 1990

[54] AIR CONDITIONER FOR AUTOMOBILES

[75] Inventor: Eiji Takahashi, Tokyo, Japan

[73] Assignee: Calsonic Corporation, Tokyo, Japan

[21] Appl. No.: 457,399

[22] Filed: Dec. 27, 1989

[30] Foreign Application Priority Data

Dec. 28, 1988 [JP] Japan .................. 63-331068

[51] Int. Cl.$^5$ ............................................ G05D 23/13
[52] U.S. Cl. ......................................... 236/13; 98/2.11; 165/42
[58] Field of Search .............. 62/244; 236/13; 165/42, 165/43; 98/2.11; 237/2 A

[56] References Cited

U.S. PATENT DOCUMENTS

| 4,134,542 | 1/1979 | Sugiura | 236/13 |
| 4,356,965 | 11/1982 | Matsushima et al. | 165/42 X |
| 4,540,040 | 9/1985 | Fukumoto et al. | 165/43 X |

FOREIGN PATENT DOCUMENTS 175008 12/1984 Japan .
74912 11/1987 Japan .

Primary Examiner—William E. Tapolcai
Attorney, Agent, or Firm—Gordon W. Hueschen

[57] ABSTRACT

In an air conditioner for automobiles, an auxiliary mixture door is provided in an air mixture chamber, which auxiliary mixture door is rotatable between a position in which it deflects the cold air stream flowing through a bypass passage and another position in which it leaves the bypass passage open. Control means is provided for adjusting the speed of rotation of a fan motor depending on the position of the auxiliary mixture door, whereby it is possible to improve the mixing of the hot and cold air streams by the auxiliary mixture door while at the same time making constant the quantity of conditioned air supplied to the room of an automobile.

7 Claims, 4 Drawing Sheets

AIR CONDITIONER FOR AUTOMOBILES

BACKGROUND OF THE INVENTION

1. Field of the Invention

The present invention relates in general to an air conditioner for automobiles, and in particular to an improved air conditioner for automobiles of the type having an auxiliary air mixture door for improving the mixing of hot and cold air streams, which is arranged such that the air blowing-out rate can be mode constant.

2. Description of the Prior Art

It is known from Japanese Provisional Utility Model Publication Nos. 191,513/1985 and 70,415/1988, for example, to provide an auxiliary air mixture door within a mixture chamber in the heater unit of an air conditioner for automobiles as a means for improving the mixing of hot and cold air streams in the air conditioner.

The air conditioner for automobiles disclosed in the latter publication comprises an intake unit 101, a cooling unit 102 and a heater unit 103, as shown in FIG. 5.

The intake unit 101 is formed with an interior-air intake 104 for introducing thereinto air from the room or interior of an automobile and an exterior-air intake 105 for introducing thereinto air from outside the room, with an intake door 107 being rotatably mounted for selectively opening and closing these intakes 104 and 105.

A fan 108 provided in the intake unit 101 serves to introduce air into the intake unit 101 and to drive the introduced air in the intake unit 101. The rate of air so introduced or driven is adjusted by controlling the speed of rotation of a fan motor 109.

The cooling unit 102 has an evaporator 110 provided therein, which is connected to a cooling cycle (not shown) for cooling the introduced air.

The heater unit 103 is provided with a heater core 111, to which a hot water pipe is connected for circulation of engine-cooling water. A bypass passage 112 is provided adjacent to the heater core 111 for conducting the air around the heater core 111. Upstream of the heater core 111, there is provided an air mixture door 113 which can be rotated to adjust the ratio of the amount of air passing the heater core 111 to the amount of air passing through the bypass passage 112.

Downstream of the heater core 111, there is formed a mixture chamber 115 where an auxiliary mixture door 150 is rotatably provided. For the purpose of minimizing the size of the heater unit 103 by making the auxiliary door 150 as small as possible, a fixed guide 120 which will not interfere with the flow of air through the bypass passage 112 is provided downstream of an air stagnation zone 119 located behind the heater core 111. When the mixture door 150 is rotated to a position C, the auxiliary mixture door 150 and the fixed guide 120 will cooperate to deflect the cold air flow through the bypass passage 112 toward the hot air flow which has passed the heater core 111, whereby the mixing of the cold and hot air streams can be facilitated.

Where an auxiliary mixture door is provided in the mixture chamber so as to deflect the hot or cold air flow thereby to improve the mixing function, however, there is a problem in that the auxiliary mixture door is still inevitably a resistance to the intake air flow which prevents a sufficient amount of air from being supplied through the air conditioner.

In addition, different rotated positions of the auxiliary mixture door may provide different air flow rates which may cause the driver or passengers to feel unpleasant or disordered.

SUMMARY OF THE INVENTION

The present invention has been made in view of such problems of the prior art. An object of the invention is therefore to provide an air conditioner for automobiles which has an improved air-mixing function and which can provide a constant amount of driven air flow.

To achieve the above object, the present invention provides an air conditioner for automobiles, comprising: an intake unit (1) which is provided with a fan (8) driven by a fan motor (9) and which selectively takes interior or ambient air in; a heater unit (3) which is provided with a heater core (11) for heating the intake air and with a bypass passage (12) extending around the heater core (11), and which conditions the intake air and supplies the conditioned air to a place in the room of an automobile in which the air conditioner is mounted; and a mixture chamber (15) formed within said heater unit (3) downstream of the heater core (11), an auxiliary mixture door (50) being provided which is rotatable between a position (B) in which it will deflect the air flow through said bypass passage (12) toward the air flow which has passed the heater core (11) down into the mixture chamber (15) and another position (A) in which it will leave the bypass passage (12) open, said air conditioner being characterized in that control means (51) is provided which adjusts the speed of rotation of the fan motor (9) depending on the position (A or B) of said auxiliary mixture door (50).

In the air conditioner so arranged, when the auxiliary mixture door is in the deflecting position (B) in which it will deflect the cold air flow toward the heated air flow, a command signal is issued from the control means for causing the fan motor to rotate at a speed which is higher by a predetermined value than when the door is in the opening position (A) in which it leaves the bypass passage open.

This permits supply to the automobile room at the same rate of air flow when the auxiliary mixture door has been rotated to the flow-impeding position (B) as the rate or air flow which is provided when the auxiliary mixture door is in the opening position (A). It is thus possible to improve the cold/hot-air mixing function while at the same time making constant the rate of air flow.

DETAILED DESCRIPTION OF THE PREFERRED EMBODIMENT

An embodiment of the present invention will now be described with reference to the accompanying drawings.

Figure 1:
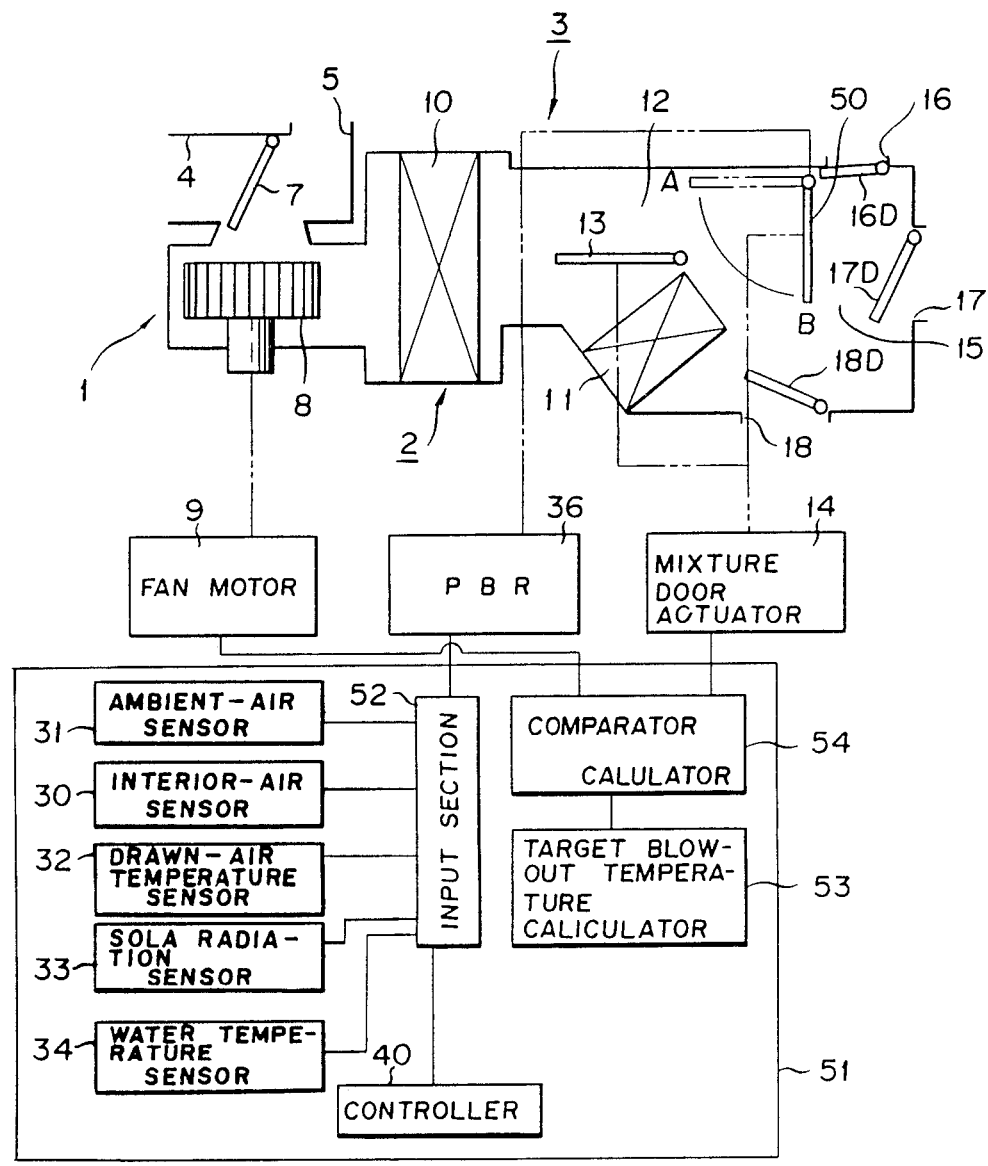
FIG. 1 is a schematic diagram showing the arrangement of an embodiment of the air conditioner for automobiles in accordance with the present invention.

The illustrated embodiment of the air conditioner for automobiles comprises an intake unit 1, a cooling unit 2 and a heater unit 3, as shown in FIG. 1.

The intake unit 1 is formed with an interior-air intake 4 for introducing thereinto air from the room of an automobile, and an exterior-air intake 5 for introducing thereinto air from outside the room, with an intake door 7 being rotatably mounted for selectively opening and closing these intakes 4 and 5. The intake door 7 is operated by means of an intake-door actuator (not shown). The amounts of air introduced through these intakes 4 and 5 are adjusted in accordance with the opening of the intake door 7.

A fan 8 provided in the intake unit 1 serves to introduce air into the intake unit 1 and to drive the introduced air in the intake unit 1. The rate of air so introduced or driven is adjusted by controlling the speed of rotation of a fan motor 9.

The speed of rotation of the fan motor 9 is controlled depending on a "target blowout temperature Tm" which will be described hereinafter. When the target blowout temperature (Tm) is high or low, a high voltage is applied to the fan motor 9 so as to raise its speed of rotation substantially to the maximum so as to take in a large amount of air which is conditioned and then supplied to the room of the automobile, so that the room temperature can be conditioned to a desired value in a short time. When the target blowout temperature (Tm) is a medium value, i.e. when the set temperature value is considerably different from the actual room temperature, the voltage to be applied to the fan motor 9 is set to a lower value so as to set the speed of rotation of the fan 8 to a lower value. Such control of the fan motor 9 based on the target blowout temperature (Tm) is effected by a control means 51 which will be described hereinafter.

Said cooling unit 2 has an evaporator 10 provided therein which is connected to a cooling cycle (not shown) for cooling the introduced air.

To implement the present invention, the cooler unit 2 is not essential and can be omitted. The intake unit 1 and a heater unit 3 to be described hereinafter may be connected together either directly or through a duct.

The heater unit 3 is provided with a heater core 11. A hot water pipe is connected to the heater core 11 for circulation of engine-cooling water therethrough. A bypass passage 12 is formed adjacent to and extends around the heater core 11. Upstream of the heater core 11, there is provided an air mixture door 13 which can be rotated by a mixture door actuator 14 for adjusting the ratio of the amount of air passing the heater core 11 to the amount of air passing through the bypass passage 12.

Downstream of the heater core 11, there is formed a mixture chamber 15, in which an auxiliary mixture door 50 is rotatably provided. The auxiliary mixture door 50 serves to deflect a cold air stream through the bypass passage 12 toward a heated air stream which has passed the heater core 11 into the mixture chamber 15, thereby mixing these cold and heated air streams. The auxiliary mixture door 50 is interlocked with the mixture door 13 by means of a linkage (not shown) and is actuated by the mixture door actuator 14.

The auxiliary mixture door 50 is rotatable between a turned-down opening position A in which it leaves the bypass passage 12 fully open, and a stood-up deflecting position B in which it will deflect the cold air stream, which has passed through the bypass passage 12, toward the hot air stream which has passed said heater core 11 into the mixture chamber 15. The mixture door actuator 14 for actuating the mixture door 13 with the auxiliary mixture door 50 is associated with a PBR (potentio-balance-resistor) 36 for detecting the position of both of the doors 13 and 50. The PBR is for determining the opening of the doors by detecting a resistance value (voltage value) which is determined by the position of the doors. A signal representative of the position of the auxiliary mixture door 50 as detected by the PBR 36 is supplied to an input section 52 of a control means 51.

The mixture chamber 15 has a number of blowout openings: a defrosting blowout opening 16, directing an air stream toward the interior surface of the windshield, a ventilative blowout opening 17 directing an air stream toward the upper half of the driver or passenger, and a heating blowout opening 18 directing an air stream toward the feet of the driver or passenger. These blowout openings 16, 17 and 18 are opened and closed by a defrosting door 16D, a ventilative door 17D and a heating door 18D, respectively. These control doors, i.e. defrosting, ventilative and heating doors 16D, 17D and 18D, are linked together by means of a generally-known linkage (not shown) which, when rotated by a predetermined angle by means of a mode door actuator (not shown), will determine the opening of each of the control doors 16D, 17D and 18D. Specifically, four modes are provided: "vent" mode in which only the ventilative door 17D is opened; "bi-level" mode in which the ventilative and heating doors 17D and 18D are half opened; "def/foot" mode in which the defrosting and heating doors 16D and 18D are half opened, and "def" mode in which only the defrosting door 16D is opened. Selection is made automatically depending on the target blowout temperature (Tm). The "def/foot" mode is selected when heating is to be effected and the target blowout temperature (Tm) is not so high; "vent" mode is selected when cooling is to be effected and the target blowout temperature (Tm) is low; "bi-level" mode is selected when the target blowout temperature (Tm) value is within a medium range between the heating temperature range and the cooling temperature range.

The present invention is not limited to such modes. Other modes are also possible. For example, the modes may comprise "vent", "bi-level", "foot" and "def" modes.

A group of sensors 35 is connected to the control means 51 for controlling the operation of said fan motor 9, intake door actuator, mixture door actuator 14 and mode door actuator. This group of sensors 35 includes: an ambient-air temperature sensor 31 for detecting the ambient air temperature; an interior-air sensor 30 for detecting the room temperature; a intake-air temperature sensor 32 for detecting the temperature of air which has flowed past the evaporator 10; a solar radiation sensor 33 for detecting the quantity of solar radiation shed into the room; and a water-temperature sensor 34 for detecting the temperature of engine-cooling water. Signals from the sensor group 35 are input to the input section 52. Of the control means 51. Signals from a controller 40 provided on an instrument panel are also input to the input section 52, a target blowout temperature calculating section 53 will calculate the target blowout temperature (Tm). A comparator/calculator 54 compares the result of such calculation with data which has been previously stored therein for correction by sensors such as the drawn-air temperature sensor 32 and the water-temperature sensor 34, so as to control each said actuator by a predetermined amount.

The term "target blowout temperature Tm" as used herein means the blowout air temperature required to change the room temperature from the current value to a set value in a predetermined length of time. The value of the target blowout temperature (Tm) is calculated from a set value of temperature which is set at the controller 40 provided in the room, and the data obtained from the ambient-air temperature sensor 31, the interior-air temperature sensor 30 and the solar radiation sensor 33. Assuming that $T_{ptc}$ is the set temperature value;
$T_{am}$ is the ambient air temperature;
$Q_{sun}$ is the quantity of solar energy; and
$T_{inc}$ is the room temperature, the value of the target blowout temperature (Tm) is calculated by the following linear expression:

$$Tm = (A+D)T_{ptc} + BT_{am} + CQ_{sun} - DT_{inc} + E,$$

where A, B, C, D and E are predetermined constants which represent influencing or weighting factors given to the target blowout temperature from the set temperature value, the ambient temperature, the quantity of solar energy and the room temperature, respectively.

As will be understood from the foregoing, the term "target blowout temperature" as used herein does not simply mean the blowout air temperature as compared to a set temperature value, but means the blowout air temperature which is required to change the room temperature from the current detected value to a given set temperature value, considering the current ambient air temperature and the current quantity of solar energy, as soon as possible after the set temperature value has been given.

When the room is to be heated to a value (25° C., for example), which is set at the control panel, the target blowout temperature (Tm) is set to a value which must be increased as the current room temperature (20° C., for example) decreases (to 10° C., for example) because a larger amount of higher temperature air should then be supplied to the room so that the set temperature value can be reached as soon as possible. The same applies to the quantity of solar energy and ambient air temperature. That is, for a set temperature value, the target blowout temperature must be set to a higher value when the quantity of solar energy decreases; it must also be set to a higher value when the ambient air temperature lowers.

On the other hand, when the room is cooled, the situation is reversed. That is, when the desired room temperature is set to 20° C. (for example) on the control panel, the target blowout temperature (Tm) is set to a value which must be lowered as the current room temperature increases (from 25° to 35° C., for example) because a larger amount of lower temperature air should then be supplied to the room so that the set temperature value can be reached as soon as possible. The same applies to the quantity of solar energy and ambient air temperature. That is, for a set temperature value, the target blowout temperature must be set to a lower value when the quantity of solar energy increases; it must also be set to a lower value when the ambient air temperature rises.

In the described embodiment, the speed of rotation of the fan motor 9, which value is determined in accordance with the target blowout temperature (Tm), is modified depending on the opening of the auxiliary mixture door 50 which has been detected by the PBR 36.

When the target blowout temperature (Tm) has a value in the medium temperature range which is near to the lower temperature range, the mixture door 13 is in a position in which it completely closes or only slightly opens the heater core 11, so that most of the air introduced through the intake unit 1 will then pass through the bypass passage 12. The auxiliary mixture door 50, them positioned in accordance with the present invention in the deflecting position B for well mixing the small amount of hot air having passed the heater core 11 with the large amount of cold air having passed through the bypass passage 12, will impede the cold air flow, decreasing the total amount of conditioned air supplied to the room.

Figure 2:
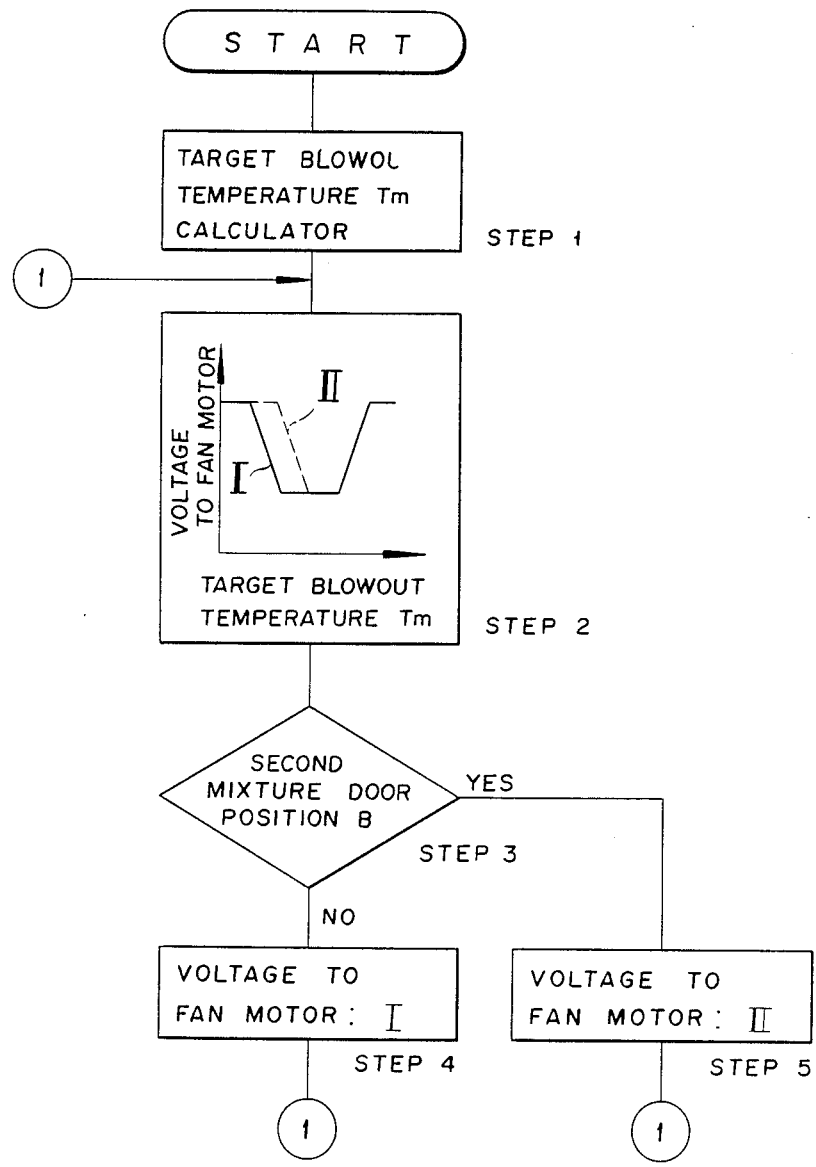
FIG. 2 is a flow chart showing the control sequence of the embodiment.

If such conditions occur, i.e., as shown in step 2 of FIG. 2, the target blowout temperature (Tm) has a value in the medium temperature range which is near to the lower temperature range, the mixture door opening is to mix the hot air from the heater core 11 with the cold air from the bypass passage 12 so as to form a conditioned air, and the auxiliary mixture door 50 is in the deflecting position B, then the voltage applied to the fan motor 9 is increased such that the speed of rotation of the fan motor 9 is increased by a predetermined amount as compared to the speed at which the the motor 9 is rotated when the mixture door 13 is in the same position but the auxiliary mixture door 50 is in the opening position A.

Meanwhile, the same manner of control can be effected when the target blowout temperature has a value within the medium temperature range which is near to the higher temperature region. In such a case, however, the amount of conditioned air supplied to the room is not so decreased because, although the auxiliary mixture door 50 is then in the deflecting position b but deflecting only a small amount of cold air, the mixture door 13 is in the position in which it almost completely closes the bypass passage 12. In the described embodiment, therefore, the speed of rotation of the fan motor 9 is modified only when the target blowout temperature (Tm) has a value in the medium temperature range which is near to the lower temperature range.

The operation of the embodiment of the air conditioner for automobiles so arranged will now be described with reference to FIGS. 1-4.

Step 1

Firstly, of various data input from the sensor group 35 to the input section 52, the room temperature $T_{inc}$ detected by the interior-air temperature sensor 30, the ambient-air temperature $T_{am}$ detected by the ambient-air temperature sensor 31 and the quantity of solar energy $Q_{sun}$ detected by the solar radiation sensor 33 are used with the set temperature value $T_{ptc}$ set by the controller 40 to calculate the target blowout temperature (Tm) in accordance with the following expression:

$$Tm = (A+D)T_{pct} + PT_{am} + CQ_{sun} - DT_{inc} + E$$

The target blowout temperature (Tm) is then modified depending on the drawn-air temperature detected by the drawn-air temperature sensor 32 and the water temperature detected by the water-temperature sensor 34, so as to determine the opening of the auxiliary mixture door 50.

Step 2 and 3

From the target blowout temperature (Tm) and from the data on the position of the auxiliary mixture door 50 given from the PBR 36, the voltage to be applied to the fan motor 9 is calculated by the comparator/calculator 54 in accordance with preset control expressions I and II.

Step 4 and 5

Figure 3:
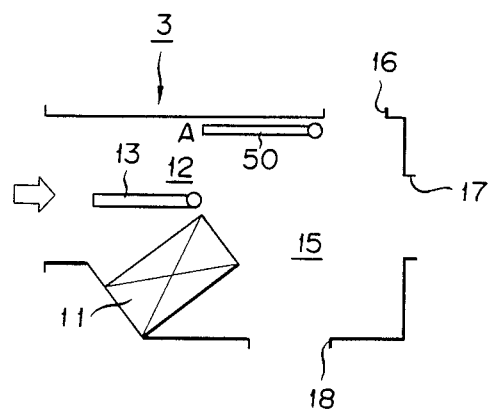
FIGS. 3 and 4 are schematic diagrams showing the operation of the embodiment.
Figure 4:
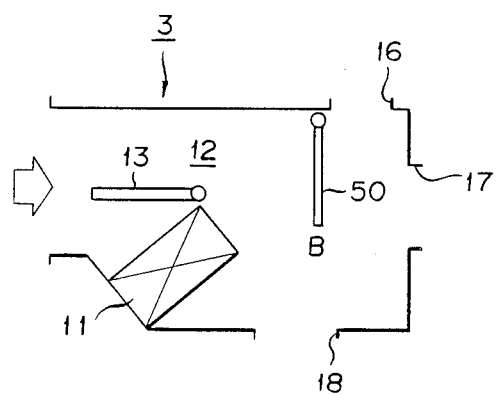
Figure 5:
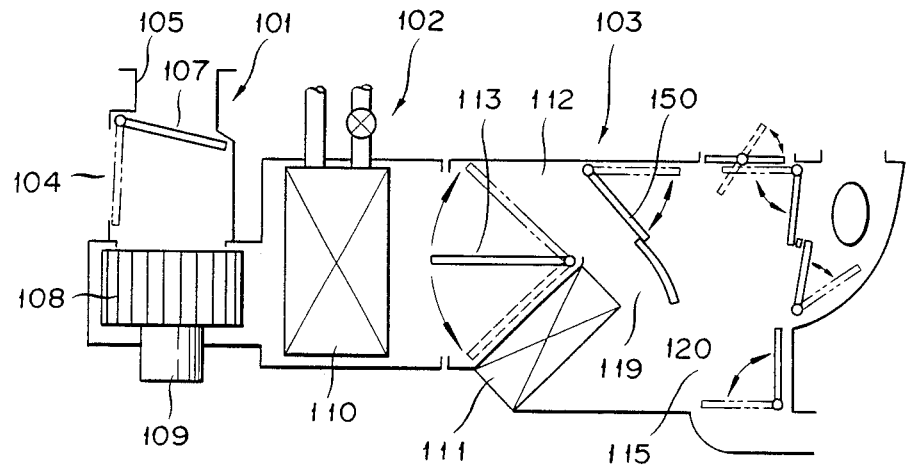
FIG. 5 is a schematic diagram showing a prior art air conditioner for automobiles.

Then, the voltage to be applied to the fan motor 9 is set to the control expression I shown in Step 2 if the auxiliary mixture door 50 is in the position A in which it opens the bypass passage 12, as shown in FIG. 3 (Step 4), while the voltage is set to the control expression II if the auxiliary mixture door 50 is in the deflecting position B, as shown in FIG. 4 (Step 5).

Since, as described, the speed of rotation of the fan motor 9 is larger by a predetermined value when the auxiliary mixture door 50 is in the stood-up deflecting position B than when the door 50 is in the turned-down opening position A, a constant amount of air can be supplied to the room irrespective of whether the auxiliary mixture door is in the opening position or in a position in which it impedes the air flow.

As will be understood from the foregoing, the present invention provides control means for changing the speed of rotation of the fan motor depending on the position of the auxiliary mixture door, whereby it is possible to improve the mixing of the hot and cold air streams by the auxiliary mixture door while at the same time making constant the quantity of conditioned air suppied to the room or interior of the car.

What is claimed is:

1. An air conditioner for automobiles, comprising:
   an intake unit (1) which is provided with a fan (8) driven by a fan motor (9) and which selectively takes interior or ambient air in;
   a heater unit (3) which is provided with a heater core (11) for heating the intake air and with a bypass passage (12) extending around the heater core (11), and which conditions the intake air and supplies the conditioned air to a place in the room or interior of an automobile in which the air conditioner is mounted;
   a mixture chamber (15) formed within said heater unit (3) downstream of the heater core (11), and
   an auxiliary mixture door (50) which is rotatable between a position (B) in which it will deflect the air flow through said bypass passage (12) toward the air flow which has passed the heater core (11) into the mixture chamber (15) and another position (A) in which it will leave the bypass passage (12) open,
   said air conditioner being characterized in that control means (51) is provided for increasing the speed of rotation of the fan motor (9) by a predetermined amount when said auxiliary mixture door (50) is in the deflecting position (B) than when the auxiliary mixture door (50) is in the opening position (A).

2. The air conditioner for automobiles as claimed in claim 1, wherein the position (A, B) of said auxiliary mixture door is detected by auxiliary mixture door position detecting means (36), whose the output of which is supplied to the control means (51).

3. The air conditioner for automobiles as claimed in claim 2, wherein said auxiliary mixture door position detecting means (36) is a potentio-balance-resistor (PBR).

4. The air conditioner for automobiles as claimed in claim 1, wherein said control means (51) includes a target blowout temperature calculating section (53) for calculating a target blowout temperature (Tm) depending on various data detected by a group (35) of sensors and a set temperature value ($T_{ptc}$).

5. The air conditioner for automobiles as claimed in claim 4, wherein said sensor group (35) includes an interior-air sensor (30) for detecting the room temperature ($T_{inc}$), an ambient-air temperature sensor (31) for detecting the ambient air temperature ($T_{am}$), and a solar radiation sensor (33) for detecting the quantity of solar radiation ($Q_{sun}$).

6. The air conditioner for automobiles as claimed in claim 1, wherein said control means (51) includes a target blowout temperature calculating section (53) for calculating a target blowout temperature (Tm) depending on various data detected by a group (53) of sensors and a set temperature value ($T_{ptc}$), the target blowout temperature (Tm) being used to control the speed of rotation of the fan motor (9), and wherein the speed of rotation of the fan motor (9) is increased when the target blowout temperature (Tm) has a value in the higher or lower temperature range, the speed of rotation of the fan motor (9) being decreased when the target blowout temperature (Tm) has a value in the medium temperature range.

7. The air conditioner for automobiles as claimed in claim 1, wherein said control means (51) includes a target blowout temperature calculating section (53) for calculating a target blowout temperature (Tm) depending on various data detected by a group (35) of sensors and a set temperature value ($T_{ptc}$), the target blowout temperature (Tm) being used to control the opening of said mixture door (13), and wherein the speed of rotation of the fan motor (9) is increased only when the target blowout temperature (Tm) has a value in the medium temperature range which is near the lower temperature value.

* * * * *

UNITED STATES PATENT AND TRADEMARK OFFICE
CERTIFICATE OF CORRECTION

PATENT NO. : 4,976,461

DATED : Dec. 11, 1990

INVENTOR(S) : Eiji Takahashi

It is certified that error appears in the above-identified patent and that said Letters Patent is hereby corrected as shown below:

```
Title Page, lower left half of drawing, number 33; "SOLA"
   should read -- SOLAR --.
Title Page, lower right half of drawing, number 54; "CALULATOR"
   should read -- CALCULATOR --.
Title Page, lower right half of drawing, number 53; "CALICULATOR"
   should read -- CALCULATOR --.
Drawing Sheet 1, Fig. 1, lower left half of drawing, number 33;
   "SOLA" should read -- SOLAR --.
Drawing Sheet 1, Fig. 1, lower right half of drawing, number 54;
   "CALULATOR" should read -- CALCULATOR --.
Drawing Sheet 1, Fig. 1, lower right half of drawing , number 53;
   "CALICULATOR" should read -- "CALCULATOR --.
Drawing Sheet 2, Fig. 2, box under "START", "BLOWOL" should read
   -- BLOWOUT --.
Column 1, approximate line 11; "mode" should read -- made --.

Column 4, line 59; "52. Of" should read -- 52 of --.
Column 4, line 61, "52, a" should read -- 52. A --.
Column 6, line 10; "them" should read -- then --.
Column 6, approximate line 28; delete "the", second occurrence.
Column 7, line 34; "suppied" should read -- supplied --.
Column 8, line 10; delete "whose".
```

Signed and Sealed this

Eighteenth Day of August, 1992

*Attest:*

DOUGLAS B. COMER

*Attesting Officer*     *Acting Commissioner of Patents and Trademarks*